United States Patent
Matsumoto et al.

(10) Patent No.: US 7,221,153 B2
(45) Date of Patent: May 22, 2007

(54) ROTATION ANGLE DETECTOR

(75) Inventors: Koichiro Matsumoto, Kariya (JP); Takao Ban, Toyohashi (JP); Takashi Kawashima, Nagoya (JP); Tatsuya Kitanaka, Nagoya (JP); Toshikazu Matsusita, Anjo (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/377,199

(22) Filed: Mar. 17, 2006

(65) Prior Publication Data

US 2006/0208727 A1 Sep. 21, 2006

(30) Foreign Application Priority Data

Mar. 18, 2005 (JP) ............... 2005-079806

(51) Int. Cl.
*G01B 7/30* (2006.01)

(52) U.S. Cl. ................................ 324/207.25

(58) Field of Classification Search ........... 324/207.22, 324/207.24, 207.25
See application file for complete search history.

(56) References Cited

U.S. PATENT DOCUMENTS 5,164,668 A 11/1992 Alfors
5,889,400 A * 3/1999 Nakazawa ............... 324/207.2

FOREIGN PATENT DOCUMENTS

JP 2003-075108 3/2003

* cited by examiner

*Primary Examiner*—Harshad Patel
*Assistant Examiner*—David M. Schindler
(74) *Attorney, Agent, or Firm*—Nixon & Vanderhye P.C.

(57) ABSTRACT

A rotation angle detector for detecting a relative rotation angle of two respective parts includes two sensors, two magnetic flux induction devices as well as a magnetic flux generation unit. Variation in the magnetic flux formed in respective gaps of the two magnetic flux induction devices is detected by using the two magnetic sensors for detecting a relative rotation angle of the two parts.

5 Claims, 7 Drawing Sheets

ROTATION ANGLE DETECTOR

CROSS REFERENCE TO RELATED APPLICATION

This application is based on and claims the benefit of priority of Japanese Patent Application No. 2005-79806 filed on Mar. 18, 2005, the disclosure of which are incorporated herein by reference.

FIELD OF THE INVENTION

The present invention generally relates to a rotation angle detector for remotely detecting a relative rotation angle of two functional parts.

BACKGROUND OF THE INVENTION

Conventionally, a rotation angle detector detects a rotation angle by using a magnetic detector at a periphery of a rotating magnet that generates magnetic flux.

FIGS. 7A and 7B show a conventional rotation angle detector that includes a magnet 1, a first magnetic sensor 4, and a second magnetic sensor 5. The magnet 1 is in a disk shape for generating a magnetic flux in a perpendicular plane to its shaft. The magnetic flux is aligned diametrically from one end of the magnet 1 to the other end. A center of the shaft of the magnet 1 is positioned at a center of a circular periphery of the magnet 1 for rotational movement of the magnet 1. The first sensor 4 and the second sensor 5 are positioned above a surface of the periphery of the magnet 1, and the two sensors are orthogonally positioned relative to the shaft of the magnet 1 for detecting the magnetic flux from the magnet 1. In this manner, the rotation angle detector can detect a wide range of rotation angle.

The magnetic sensors 4, 5 output detection signals relative to the magnetic flux in a shape of sine curve and in a shape of cosine curve, and the detection signals are converted by an inverse-trigonometric calculation unit (a microcomputer) to have a linear characteristic of increasing nature in an interval of 180 degrees. The detection signals converted in this manner are connected for a coverage of 360 degrees. This method of rotation angle detection is disclosed in Japanese patent document JP-A-2003-75108, and diagrams shown in FIGS. 3A, 3B and 3C illustrate the sine/cosine curves and converted linear outputs from the rotation angle detector.

However, the magnetic flux generated by the magnet 1 forms an open magnetic field at the periphery of the magnet 1 as represented by a chain line circle α in FIG. 8. That is, the magnetic flux at the positions of the sensors 4, 5 in a broken line circle β in FIG. 8 is not aligned to a certain direction but in a radially extending from the periphery of the magnet 1. Therefore, a small positional displacement of the first and second sensors 4, 5 caused by mechanical vibration, assembly error or the like results in a enlarged change in the output from the sensors 4, 5. The change in the output from the sensors 4, 5 leads to an amplification of the error in a detected rotation angle.

The defects described above is more practically described with reference to the drawing in FIGS. 9A, 9B and 9C. The coordinates are defined based on X/Y axes in the plane in parallel with the magnet 1, and Z axis aligned with the shaft in the description.

The positional displacement of the sensor 4 in Y axis direction creates displacement in an output wave form A2 in a chain line against the standard output wave form A1 in a solid line as shown in FIG. 9A. The displacement in the output wave form is relatively large even when the displacement of the sensor 4 is only 1 mm. The displacement in the output wave form is also observed when the displacement of the sensor 4 is 1 mm in Z axis direction. The displacement is shown as the wave form A3 in a broken line in FIG. 9A.

The positional displacement of the sensor 5 can be described in the same manner as the sensor 4. That is, the displacement of the sensor 5 in Y axis direction by 1 mm is observed as a large amount of displacement in a wave form B2 in the chained line in FIG. 9B against a standard output wave form B1 in the solid line. The displacement of the sensor 5 in Z axis direction by 1 mm also results in a displacement in the output as shown in a wave form B3 in FIG. 9B.

Error in a detected rotation angle based on the output from the magnetic sensors 4, 5 is shown in FIG. 9C. That is, the displacement of the sensor 4 or 5 by 1 mm in Y axis direction results in a large amount of error in the output of calculation of the detected rotation angle as shown by a curve C1 in a solid line in FIG. 9C. The displacement of the sensor 4 or 5 in Z axis direction by 1 mm also results in error in the output of the detected rotation angle as shown by a curve C2 in a broken line in FIG. 9C.

An improvement over the conventional rotation angle detector is devised as an example shown in FIG. 10A.

The example of the improved rotation angle detector includes a circular magnet 1 in a disk shape with its shaft aligned with a center of rotation of the magnet 1, and a magnetic sensor 4 and a magnetic members 7, 8. The magnet 1 generates magnetic flux from one end toward the other of the disk shape, and the sensor 4 detects the magnetic flux for generating an output relative to the magnetic flux. The magnetic members 7 and 8 are used to form a magnetic flux induction unit 2 for inducing the magnetic flux from one point radially outside of the magnet 1 to the other point. The magnetic sensor 4 is positioned in a gap G between the two magnetic members 7, 8. In this manner, the magnetic sensor 4 is positioned in the magnetic flux from the magnetic member 7 to 8 (or 8 to 7).

The magnetic members 7 and 8 reflect change of the magnetic flux caused by a rotation of the magnet 1 relative to the magnetic members 7, 8, thereby changing the magnetic flux in the gap G. That is, the output from the sensor 4 in the gap G changes correspondingly. The output from the sensor 4 draws a sine curve. Then, an angle calculation unit (a microcomputer) calculates a detected rotation angle based on a liner characteristic of the sine curve in a range of ±60 degrees around a rotation angle of 180 degrees in the output from the sensor 4.

The magnetic flux in the gap G forms a closed magnetic field, thereby preventing the error in the output from the sensor 4 caused by the displacement of either of the position of the magnetic members 7, 8, the position of the sensor 4 in the gap G or the like. United States patent document U.S. Pat. No. 5,164,668 discloses a rotation angle detector having a structure described above.

The rotation angle detector in FIG. 10A cannot detect the rotation angle in a range of 360 degrees as the rotation angle detector in FIG. 7A, because of a limitation of the detection range caused by the nature of the sine curve outputted from the sensor 4. Further, the output from the sensors 4 and 5 in the gap G (sensing surfaces of the sensors 4, 5 are orthogonally arranged) cannot generate the similar output as the rotation angle detector in FIG. 7A. Therefore, the rotation angle detector in FIG. 10A cannot detect the angle in a range of 360 degrees.

SUMMARY OF THE INVENTION

In view of the above-described and other problems, the present invention provides a rotation angle detector that detects a relative rotation angle in a range of angle of 360 degrees, with an error-reduction capacity against positional displacement of a sensor by mechanical vibration, assembly error or the like.

The rotation angle detector of the present invention includes a magnet, two magnetic flux induction devices and two magnetic sensors. The magnetic sensors detect the magnetic flux induced by the magnetic flux induction devices. The magnetic flux induction devices in a crisscross position around the magnet are so disposed that two vectors of the magnetic flux induced through the induction units orthogonally cross in a space, or in a gap, between a pair of opposing ends of the respective induction devices. That is, the magnetic flux around the rotating magnet is brought to the gaps through the induction devices for detection of the rotation angle by the magnetic sensors. In this manner, outputs from the two sensors in forms of a sine curve and a cosine curve reflect relative rotation of the magnet to the sensors, and are integrated for detection of the rotation angle in a range of 360 degrees.

The magnetic flux induction devices, a first one and a second one, form a closed magnetic field in a space of a first gap between the opposing ends of the first induction device and in a space of a second gap between the opposing ends of the second induction device. The space in the first gap and the space in the second gap substantially perpendicularly intersect with each other. Therefore, positional displacement of the sensors, i.e., a first sensor and a second sensor, is not reflected in output signals from the two sensors. As a result, errors in the output signal of the rotation angle detector are prevented when the sensors are dislocated by mechanical vibration, assembly error or the like.

Another aspect of the rotation angle detector of the present invention is described as a position of the opposing ends of the induction devices on the magnet facing side. That is, the opposing ends of the respective induction devices are facing toward a circular outer periphery of the magnet. In this manner, reduced spacing between the magnet and one of the two opposing ends of the respective induction devices causes increased spacing on the other side of the magnet, that is, the widened spacing between the magnet and the other opposing end of the induction device, when the magnet is eccentrically dislocated from a standard position toward one side for some reason. This structure of compensation of spacing is same in both of the two induction devices. Therefore, error in detected rotation angle caused by dislocation in the detector is suppressed because the structure prevents change in the magnetic flux between the magnet and the induction devices in an occasion of dislocation.

Yet another aspect of the rotation angle detector of the present invention can be described as a pair of the opposing ends of the induction devices being disposed in parallel to each other. In this manner, the space in the first and the second gaps has an increased area of the magnetic flux that is arrayed in a same direction. Therefore, the error in the output of the rotation angle detector caused by the dislocation is reduced.

Still yet another aspect of the rotation angle detector of the present invention can be described as a pair of the opposing ends of the induction devices being formed in a protruding manner. In this manner, the error in the output signal of the rotation angle detector caused by the dislocation is reduced because of an increased density of the magnetic flux in the magnetic gaps.

Still yet another aspect of the rotation angle detector of the present invention can be described as an orthogonal positioning of the two gaps between the both ends of the first and the second induction devices for sharing a same space of rotation angle detection by the magnetic sensors. In this manner, volume of the rotation angle detector is reduced, thereby improving mountability of the detector on a vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
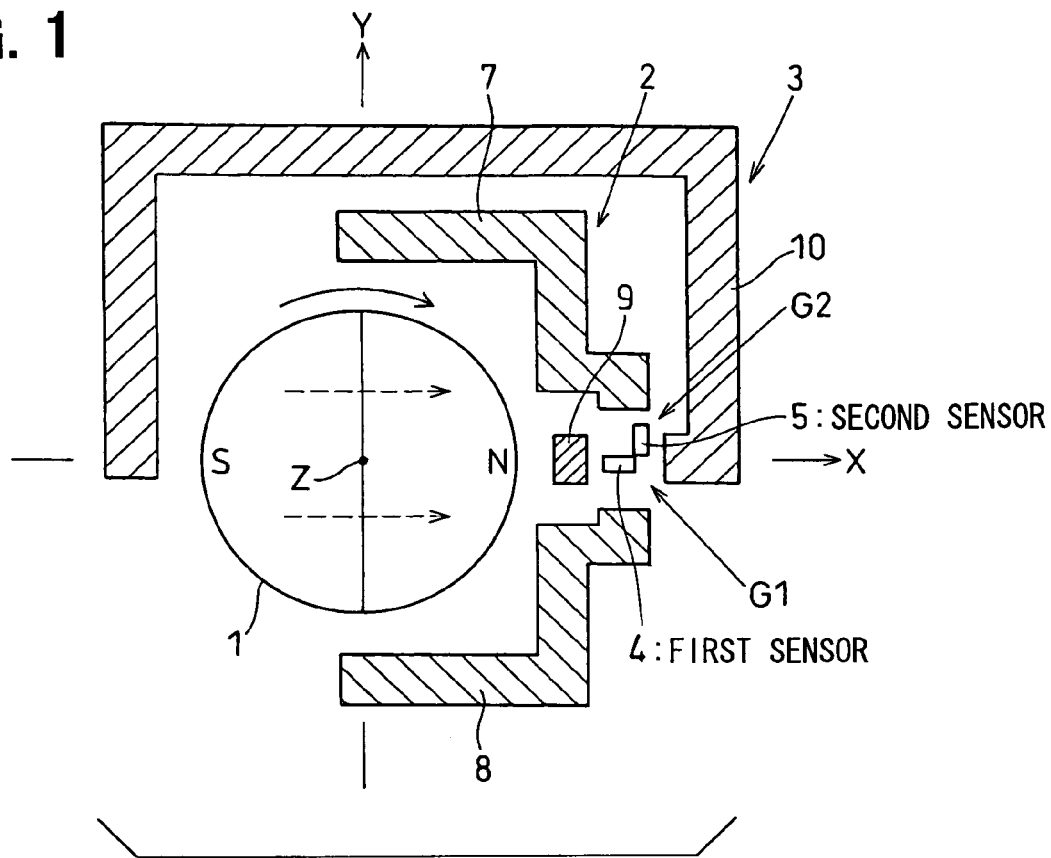
FIG. 1 shows an illustration of a rotation angle detector in a first embodiment of the present invention.

Embodiments of the present invention are described with reference to the drawings. A rotation angle detector having a first part on a rotation axis for relative rotation to a second part basically includes following components. That is, a magnet, a first magnetic sensor, a second magnetic sensor, a first magnetic flux induction device and a second magnetic flux induction device.

The magnet in the first part is magnetized for generating magnetic flux arrayed in a direction perpendicular to the rotation axis, and the rotation axis of the magnet and a center of the magnet are substantially coaxial. The first magnetic sensor generates an output signal corresponding to a variation in the applied magnetic flux, and the second magnetic sensor generates an output signal corresponding to a variation in the applied magnetic flux.

The first magnetic flux induction device in the second part induces the magnetic flux from one circumferential portion of the magnet to an opposite circumferential portion of the magnet through a position of the first magnetic sensor, and the first magnetic flux induction device includes a first and a second magnetic flux induction units. Each of the first and the second magnetic flux induction units has a magnet facing portion at one end and at the opposite end. The magnet facing portions of the first and the second magnetic flux induction units are disposed in radially opposite positions relative to the rotation axis of the magnet for receiving the magnetic flux, and the sensor facing portions of the first and the second magnetic flux induction units are oppositely disposed to form a first magnetic gap.

The second magnetic flux induction means disposed in the second part induces the magnetic flux from another circumferential portion of the magnet to another opposite circumferential portion of the magnet through a position of the second magnetic sensor that is substantially in an angle of 90 degrees relative to the magnetic flux induced by the first magnetic flux induction device. The second magnetic flux induction device includes a third and a fourth magnetic flux induction units. Each of the first and the second magnetic flux induction unit has a magnet facing portion at one end and a sensor facing portion at the opposite end. The magnet facing portions of the third and fourth magnetic flux induction units are disposed in radially opposite positions relative to the rotation axis of the magnet for receiving the magnetic flux, and the sensor facing portions of the third/fourth magnetic flux induction units are oppositely disposed to form a second magnetic gap.

Relationship of the magnetic sensors and the magnetic gaps is as follows. That is, the first magnetic sensor is disposed in the first magnetic gap, and the second magnetic sensor is disposed in the second magnetic gap.

In this structure, the first magnetic flux induction device and the second magnetic flux induction device in the rotation angle detector respectively induce the magnetic flux substantially in orthogonal directions, and a relative rotation angle between the first part and the second part of the rotation angle detector is detected based on the output signal from the first magnetic sensor and the output from the second magnetic sensor.

(First Embodiment)

A first embodiment of the rotation angle detector in the present invention is described with reference to FIGS. 1 to 3A, 3B, and 3C.

Figure 2:
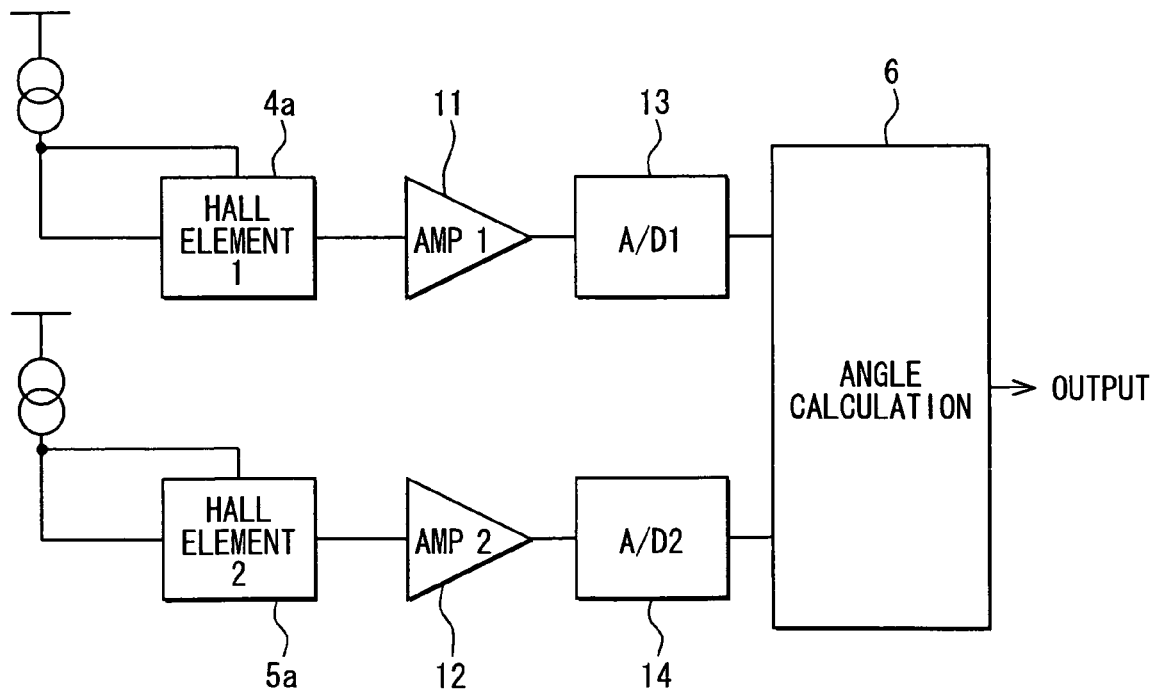
FIG. 2 shows a schematic diagram of an electronic circuit of the rotation angle detector in the first embodiment.

FIG. 1 shows an illustration of the rotation angle detector in the first embodiment, and FIG. 2 shows a schematic diagram of an electric circuit of the rotation angle detector in the first embodiment.

Coordinates and/or directions in the following description is determined based on X/Y axes orthogonally arranged in radial directions on a perpendicular plane to the shaft and Z axis aligned with an axial direction of the shaft.

The rotation angle detector in the present embodiment has a shaft, a magnet 1 in a disk shape on the shaft, a substrate (not shown in the figure) made of a non-magnetic material for supporting a first and a second magnetic induction devices 2, 3, a first and a second magnetic sensors 4, 5 on the substrate, and an angle calculation unit 6. The magnet 1 with the shaft and the magnetic flux induction devices 2, 3 with the sensors 4, 5 relatively rotate against each other for, for example, detecting a degree of opening of a throttle valve as a throttle opening sensor.

The magnet 1 is a permanent magnet in a shape of a disk. Thickness of the magnet 1 is constant in all areas, and the shaft is attached for rotatably supporting the magnet 1. An axis of the shaft is aligned with Z axis.

The magnetic poles in the magnet 1 are so arranged that the magnetic flux aligns with a diameter of the magnet 1 from one side to the other in a plane perpendicular to Z axis. That is, the magnetic flux from the magnet 1 aligns with a broken arrow in FIG. 1 pointing rightward, or, in other words, the magnetic flux aligns with a direction of X axis with an arrangement of an N pole (start portion of the magnetic flux) and an S pole (end portion of the magnetic flux).

The first magnetic flux induction device 2 is disposed along a surface of the non-magnetic substrate, and induces the magnetic flux from one side (radially outside of a periphery) of the magnet 1 to the other side (i.e., from one side of Y axis to the other side in FIG. 1) through a space in a first gap G1 that accommodates the first magnetic sensor 4.

The magnetic flux induction device includes two parts, that is, a first magnetic flux induction unit 7 made of a magnetic material that induces the magnetic flux from one side of the magnet 1 to the first gap G1, and a second magnetic flux induction unit 8 with a same material that induces the magnetic flux from the first gap G1 to the other side of the magnet 1. The magnetic material used for the induction units 7, 8 is a metal piece such as soft iron or the like that is high in magnetic flux inductivity.

Magnet facing portions, i.e., magnetic force reception portion, on one end of the first and the second magnetic flux induction units 7, 8 are positioned on diametrically opposing positions around Z axis in an angle of 180 degrees. That is, the magnet facing portions of the induction units 7, 8 faces an outer periphery of the magnet 1. More practically, the magnet facing portion of the first induction unit 7 in the present embodiment faces the magnet 1 on one side in Y axis direction (an upper side in FIG. 1), and the magnet facing portion of the second induction unit 8 in the present embodiment faces the magnet 1 on the other side in Y axis direction (a lower side in FIG. 1).

Sensor facing portions on the other end of the first and the second magnetic flux induction units 7, 8 are positioned in opposing positions in an angle of 180 degrees around the first gap G1. More practically, the sensor facing portion on the first magnetic flux induction unit 7 faces downward in Y axis direction (a lower side of FIG. 1), and the sensor facing portion on the second magnetic flux induction unit 8 faces upward in Y axis direction (an upper side of FIG. 1).

The sensor facing portions on the induction units 7, 8 are positioned in parallel in the present embodiment in order to increase an area where the magnetic flux is aligned in one direction in a space that accommodates the first magnetic sensor 4.

The second magnetic flux induction device 3 is disposed along a surface of the non-magnetic substrate in the same manner as the first magnetic flux induction device 2, and induces the magnetic flux from one side (radially outside of a periphery) of the magnet 1 to the other side (i.e., from one side of X axis to the other side in FIG. 1) through a space in a second gap G2 that accommodates the second magnetic sensor 5. Direction of the magnetic flux induced by the second induction device 3 is in an angle of 90 degrees against the direction of the magnetic flux induced by the first induction device 2.

The magnetic flux induction device includes two parts, that is, a third magnetic flux induction unit 9 made of a magnetic material that induces the magnetic flux from one side of the magnet 1 to the first gap G2 and a fourth magnetic flux induction unit 10 with a same material that induces the magnetic flux from the first gap G2 to the other side of the magnet 1. The magnetic material used for the induction units 9, 10 is a metal piece such as soft iron or the like that is high in magnetic flux inductivity.

Magnet facing portions, i.e., magnetic force reception portions, on one end of the third and the fourth magnetic flux induction units 9, 10 are positioned on diametrically opposing positions around Z axis in an angle of 180 degrees. That is, the magnet facing portions of the induction units 9, 10 faces an outer periphery of the magnet 1. More practically, the magnet facing portion of the third induction unit 9 in the present embodiment faces the magnet 1 on one side in X axis direction (a right side in FIG. 1), and the magnet facing portion of the second induction unit 10 in the present embodiment faces the magnet 1 on the other side in X axis direction (a left side in FIG. 1).

Sensor facing portions on the other end of the third and the fourth magnetic flux induction units 9, 10 are positioned in opposing positions in an angle of 180 degrees around the first gap G1. More practically, the sensor facing portion on the third magnetic flux induction unit 9 faces downward in X axis direction (a right side of FIG. 1), and the sensor facing portion on the fourth magnetic flux induction unit 10 faces upward in X axis direction (a left side of FIG. 1).

The sensor facing portions on the induction units 9, 10 are positioned in parallel in the present embodiment in order to increase an area where the magnetic flux is aligned in one direction in a space that accommodates the second magnetic sensor 5.

In the present embodiment, a total length of the first and the second magnetic flux induction units (total length of the magnetic flux) and a total length of the third and the fourth magnetic flux induction units (total length of the magnetic flux) are substantially the same. In this manner, an amount of change of the magnetic flux in the first gap G1 and an amount of change of the magnetic flux in the second gap G2 are evenly managed.

In the present embodiment, the first sensor 4 is positioned in the first gap G1, and the second sensor 5 is positioned in the second gap G2.

The first magnetic sensor 4 and the second magnetic sensor 5 are closely disposed substantially in an angle of 90 degrees at one place in a crossing of the first and the second gaps G1, G2. A combination vector of the magnetic flux in the two gaps G1, G2 rotates in an angle of 360 degrees at the positions of the first and the second sensor 4, 5 as the magnet 1 rotates in an angle of 360 degrees.

The first magnetic sensor 4 is disposed on a non-magnetic substrate, and includes a first Hall element 4a that outputs a signal relative to a density/direction of the magnetic flux captured by a sensing surface (refer to FIG. 2). The element 4a is coupled with a first amplifier 11 for an amplification of a weak output. The first amplifier 11 may be enclosed in the first sensor 4, or may be disposed separately from the first sensor 4.

The second magnetic sensor 5 is disposed on a non-magnetic substrate, as is the first sensor 4, and includes a second Hall element 5a that outputs a signal relative to a density/direction of the magnetic flux captured by a sensing surface (refer to FIG. 2). The element 5a is coupled with a second amplifier 12 for an amplification of a weak output. The second amplifier 12 may be enclosed in the second sensor 5, or may be disposed separately from the second sensor 5.

The first and the second sensors 4, 5 are closely positioned in the crossing of the first and the second gaps G1, G2. The angle between the first and the second sensors 4, 5 is substantially 90 degrees. In this manner, the first sensor 4 outputs an electric signal relative to change in the magnetic flux in the first gap G1, and the second sensor 5 outputs an electric signal relative to change in the magnetic flux in the second gap G2. Therefore, the output from the first sensor 4 draws a sine curve A in FIG. 3A, and the output from the second sensor 5 draws a cosine curve B in FIG. 3A.

The angle calculation unit 6 is a well-known type of DSP (Digital Signal Processor), a microcomputer or the like, and receives inputs from the first sensor 4 and from the second sensor 5 as shown in FIG. 2. That is, the sensor output A from the first sensor 4 is converted to a digital signal by a first A/D converter 13, and the sensor output B from the second sensor 5 is converted to a digital signal by a second A/D Converter 14 before inputted to the calculation unit 6.

Figure 3A:
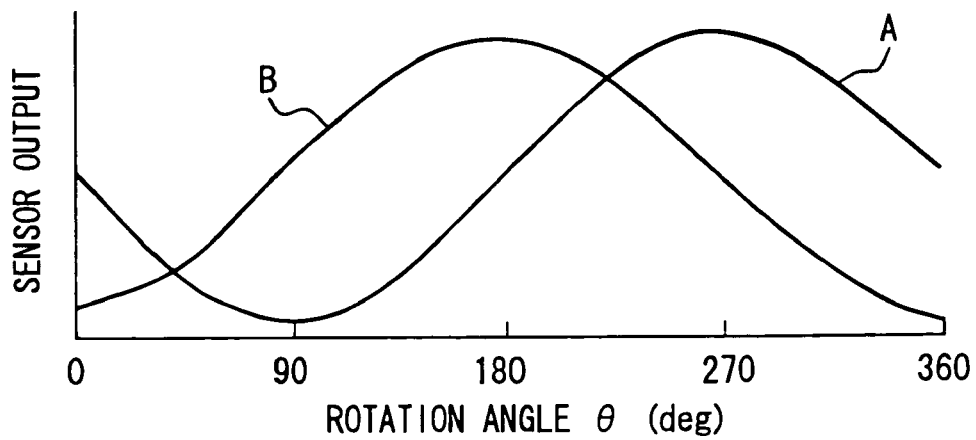
FIG. 3A shows a diagram of an output wave form from magnetic sensors of the rotation angle detector in the first embodiment.
Figure 3B:
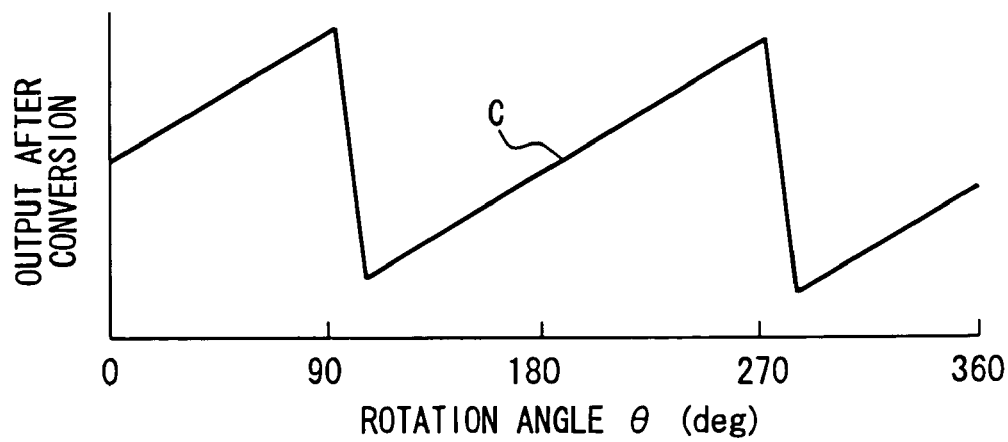
FIG. 3B shows a diagram of an inverse-trigonometric calculation operated on the output from the magnetic sensors of the rotation angle detector in the first embodiment.
Figure 3C:
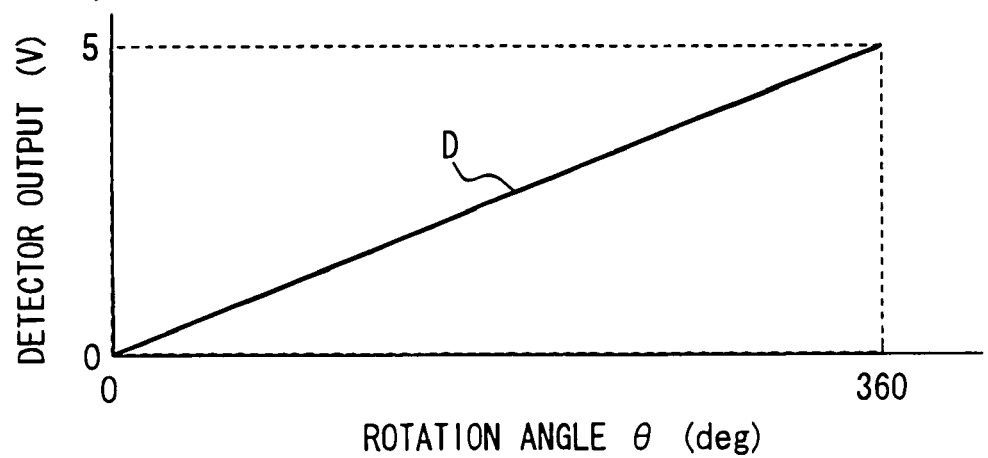
FIG. 3C shows a diagram of a linear output from the rotation angle detector after connecting operation in the first embodiment.

The angle calculation unit 6 calculates a rotation angle based on the outputs from the sensors 4, 5. That is, the sine curve output from the first sensor 4 and the cosine curve output from the second sensor 5 in FIG. 3A are converted to a linear output C in a range of 180 degrees having an increasing nature by inverse-trigonometric function as shown in FIG. 3B ($\tan \theta = \sin \theta / \cos \theta$ to $\theta = \tan^{-1}(\sin \theta / \cos \theta)$). Then, the angle calculation unit 6 connects the output for a range of 180 degrees to yield a rotation angle output D in a range of 360 degrees as shown in FIG. 3C.

The rotation angle calculation is in a different manner when the angle between the first and the second sensor 4, 5 is not 90 degrees but an angle of $\alpha$ degrees. That is, the angle calculation unit 6 first calculates $\tan \theta$ first ($\tan \theta = \cot \alpha/2(\sin \theta - \cos \theta)/(\sin \theta + \cos \theta)$), then the $\tan \theta$ is converted to a linear output C having an increasing nature in a range of 180 degrees by an inverse-trigonometric function ($\theta = \tan^{-1}\{\cot \alpha/2(\sin \theta - \cos \theta)/(\sin \theta + \cos \theta)\}$). The linear output C in the range of 180 degrees is connected to have the rotation angle output D in the range of 360 degrees.

The rotation angle detector outputs the detected rotation angle in the following manner. That is, the magnet 1 rotates on the shaft for applying change in the magnetic flux to the sensors 4, 5 in the first and the second gaps G1, G2 through the first, the second, the third and the fourth magnetic flux induction units 7, 8, 9, 10. Then, the first sensor 4 outputs the sensor output A relative to the rotation of the magnet 1, and the second sensor 5 outputs the sensor output B relative to the rotation of the magnet 1.

The angle calculation unit 6 calculates the rotation angle based on the sensor outputs A, B for outputting the rotation angle output D in the range of 360 degrees. In this manner, the rotation angle detector can detect the rotation angle of the magnet 1 and the shaft, or, for example, an opening angle of a throttle.

Effects derived from use of the rotation angle detector in the first embodiment can be summarized as follows. That is, (1) the rotation angle detector can detect the rotation angle of the shaft and the magnet in a range of 360 degrees, and (2) the magnetic flux in the detector is looped to form a closed magnetic field through the magnetic flux induction units to be precisely detected by the sensors in the gaps of the induction units. This structure realizes a "disposition-proof" accuracy of the detected rotation angle. That is, disposition effect to the sensors in the detector due to the mechanical vibration, assembly error or the like can either be decreased or diminished.

Further, (3) the dislocation/inclination of the magnet 1 to one side can be structurally compensated by or traded with the other side in terms of spacing between the magnet 1 and the induction units for "robustness" in the rotation angle detection.

Furthermore, (4) the sensor facing plane surfaces of the induction units around the gaps are disposed in parallel for having an increased area of aligned magnetic flux. This structure also benefit the robustness of the rotation angle detection.

Furthermore, (5) the induction units are disposed along the surface of the substrate with the sensors in the detector. This structure benefits the compactness of the rotation angle detector.

Furthermore, (6) the first gap and the second gap of between the induction units share the same space for compactness of the detector. The compactness of the detector leads to an improved mountability for use in a vehicle or the like.

(Second Embodiment)

Figure 4:
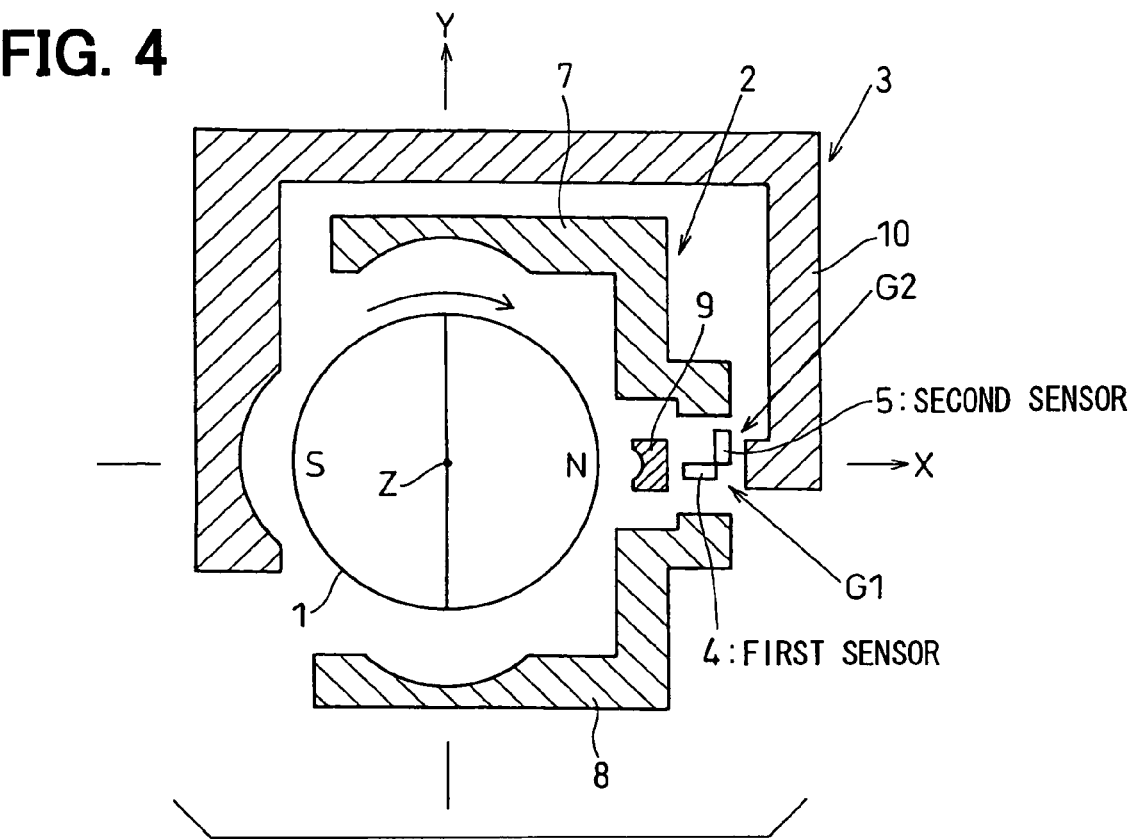
FIG. 4 shows an illustration of the rotation angle detector in a second embodiment.

A second embodiment of the present invention is described with reference to FIG. 4. Like numbers in the following description represent like parts in the description.

In the second embodiment of the present invention, the magnetic flux induction units 7, 8, 9, 10 are extended circumferentially along the outer periphery of the magnet 1. That is, the induction units have arc portions as the magnet facing portions along the periphery of the magnet 1. In this manner, the magnet facing portions have larger areas to induce an increased amount of the magnetic flux to the first and the second gaps G1, G2. As a result, the magnetic sensors 4, 5 can receive an increased amount of the magnetic flux to yield the rotation angle with an improved accuracy.

(Third Embodiment)

Figure 5:
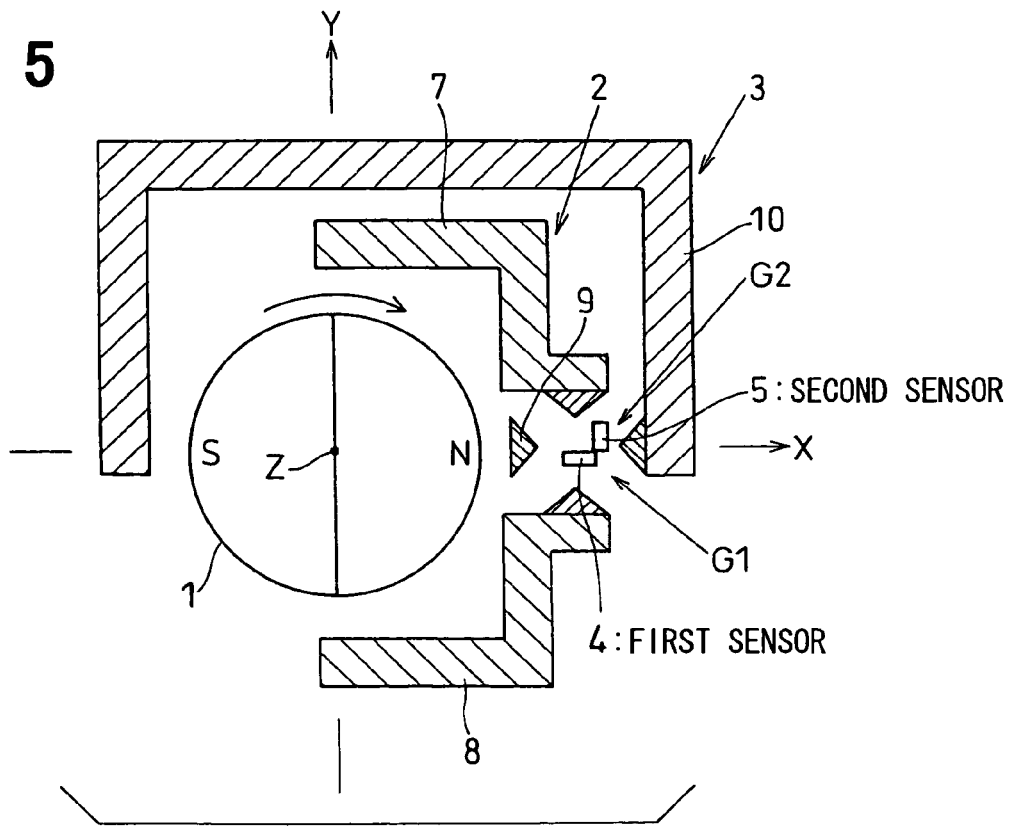
FIG. 5 shows an illustration of the rotation angle detector in a third embodiment.

A third embodiment of the present invention is described with reference to FIG. 5.

In the third embodiment of the present invention, the sensor facing portions of the induction units 7, 8, 9, 10 are protrudingly formed toward the sensors 4, 5 in the gaps G1, G2. In this manner, density of the magnetic flux in the gaps G1, G2 are partially increased, thereby improving the accuracy in the rotation angle detection.

The shape of the protruding portions may be a trigonal pyramid, a cone, a hemisphere, a half cylinder or the like. That is, the protruding portion may be in any shape that can be included in the gaps G1, G2.

(Fourth Embodiment)

Figure 6:
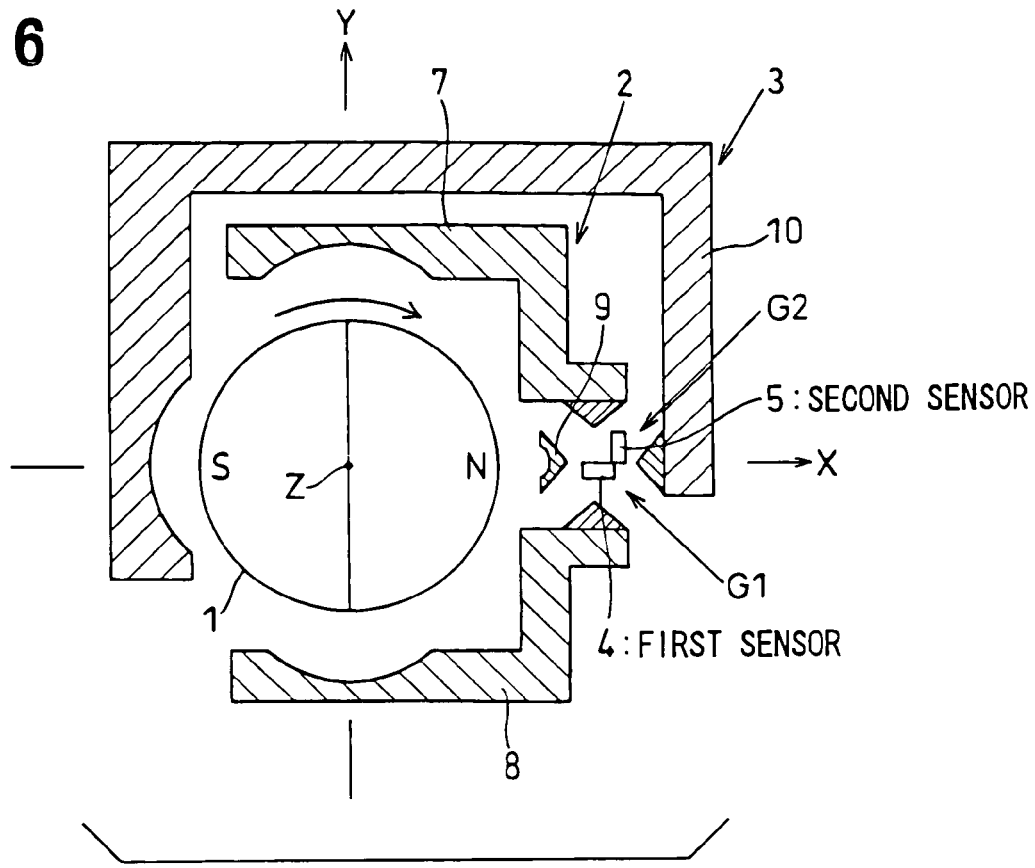
FIG. 6 shows an illustration of the rotation angle detector in a fourth embodiment.
Figure 8:
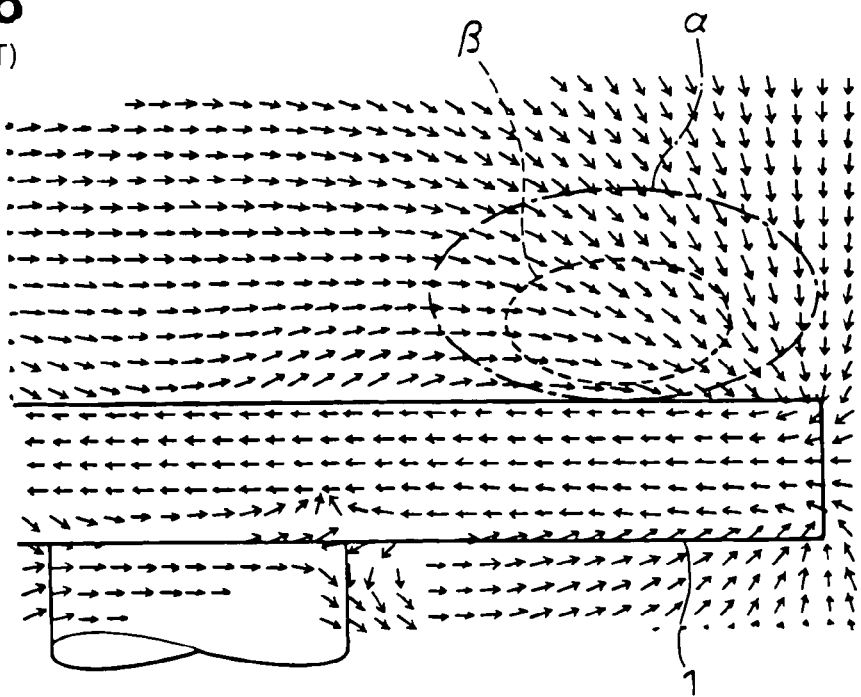
FIG. 8 shows a vector representation of a magnetic field in an axial plane of the conventional rotation angle detector.
Figure 7A:
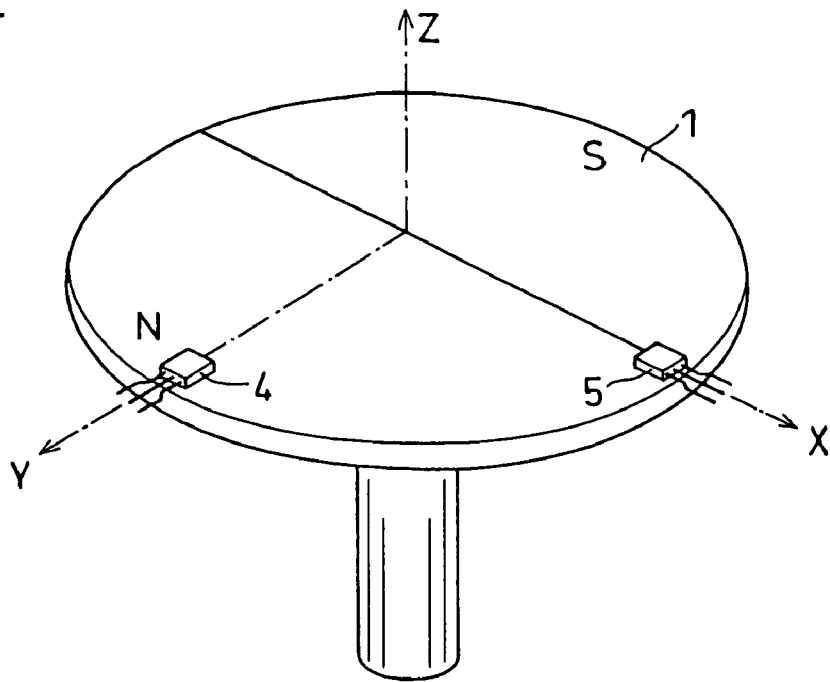
FIG. 7A shows a perspective view of a conventional rotation angle detector.
Figure 7B:
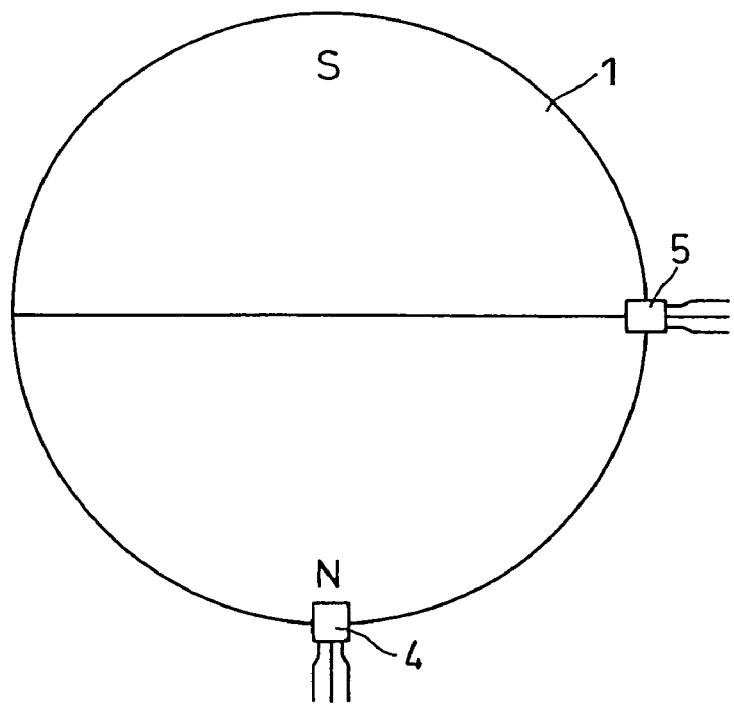
FIG. 7B shows a top view of the conventional rotation angle detector.
Figure 9A:
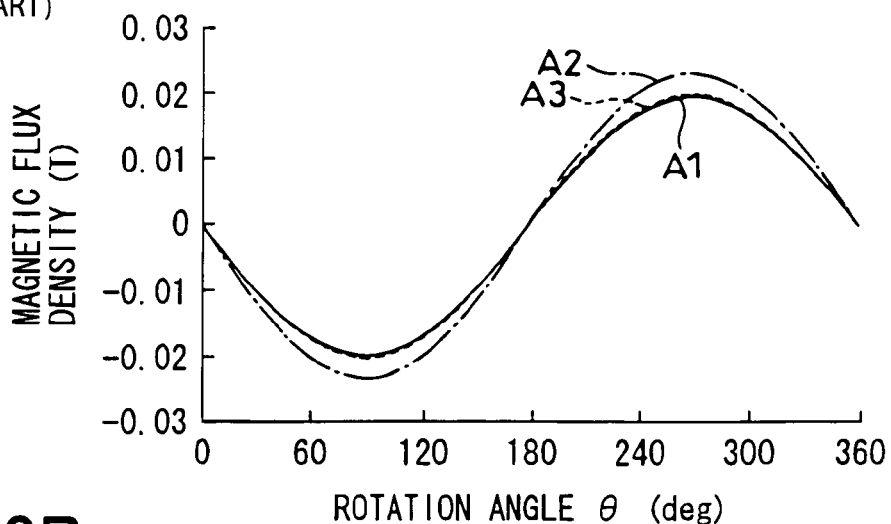
FIG. 9A shows a diagram of output curves from a first magnetic sensor of the conventional rotation angle detector.
Figure 9B:
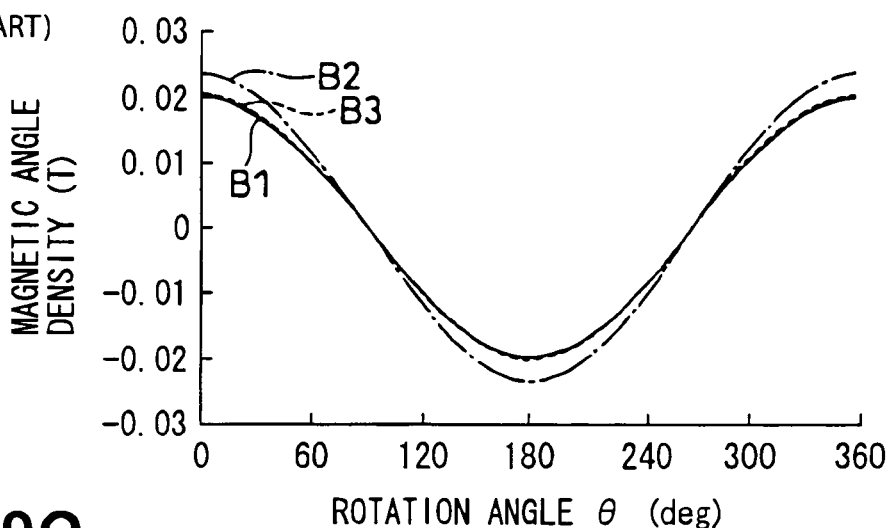
FIG. 9B shows a diagram of output curves from a second magnetic sensor of the conventional rotation angle detector.
Figure 9C:
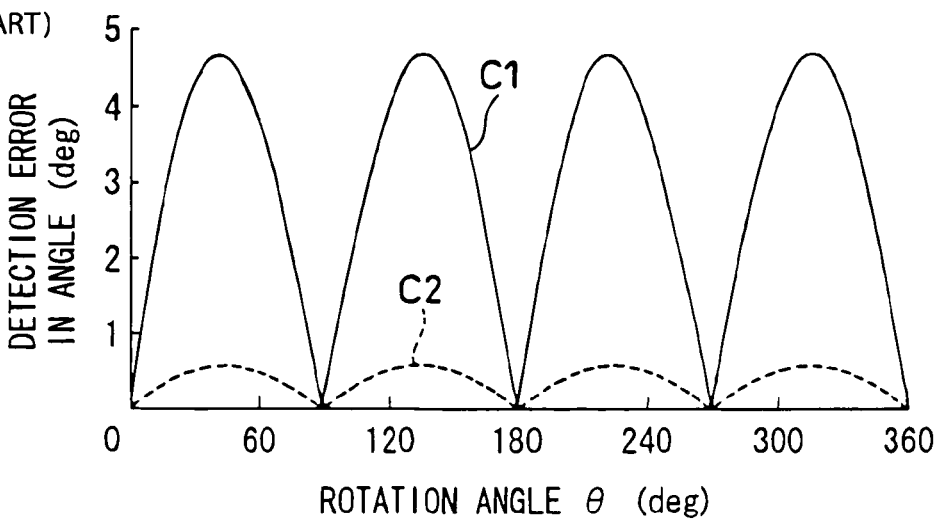
FIG. 9C shows a diagram of error in a rotation angle detected by the first and second magnetic sensors of the conventional rotation angle detector.
Figure 10A:
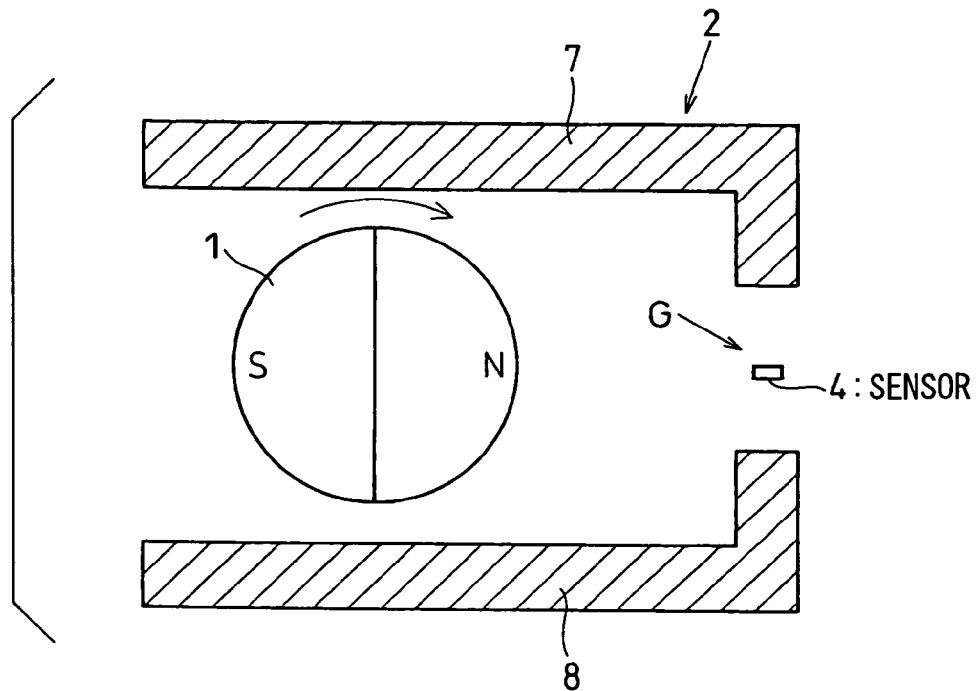
FIG. 10A shows an illustration of a conventional rotation angle detector of another type.
Figure 10B:
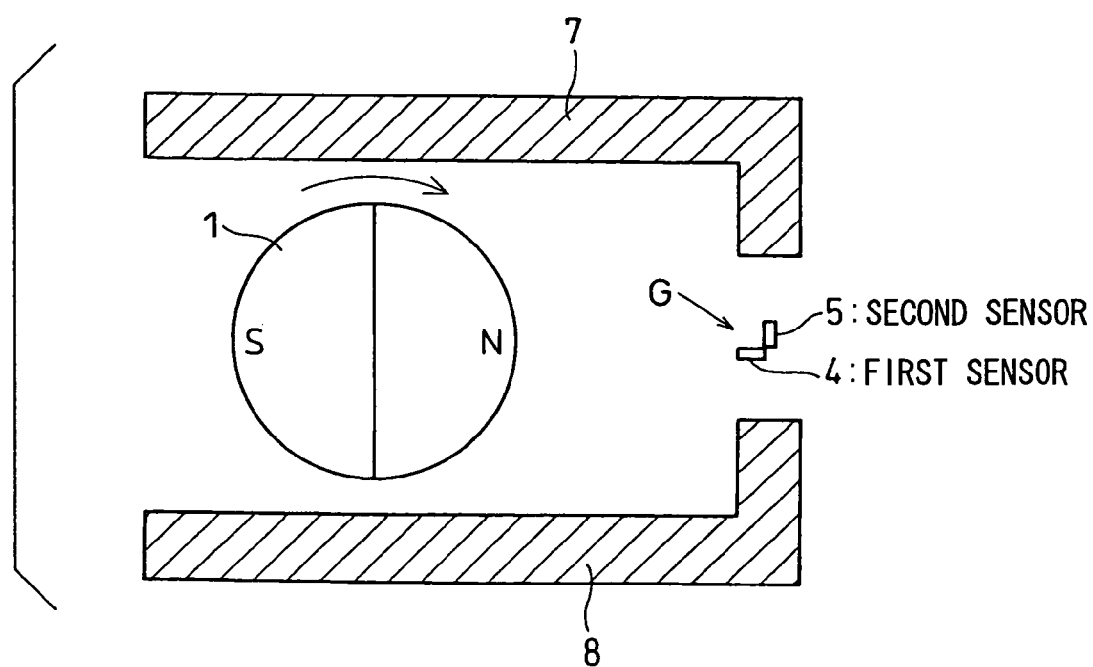
FIG. 10B shows an illustration of the conventional rotation angle detector of another type.

A fourth embodiment of the present invention is described with reference to FIG. 6.

In the fourth embodiment of the present invention, the rotation angle detector includes a combined feature that is found in the second embodiment and in the third embodiment. That is, the magnet facing portions of the induction units 7, 8, 9, 10 are extendingly formed in an arc shape, and the sensor facing portions are protrudingly formed in a convex surface. In this manner, density of the magnetic flux in the gaps G1, G2 can be increased to have an improved accuracy in detection of the rotation angle.

Although the present invention has been fully described in connection with the preferred embodiment thereof with reference to the accompanying drawings, it is to be noted that various changes and modifications will become apparent to those skilled in the art.

For example, at least one of the first and the second magnetic flux induction devices 2, 3 may be equipped with a magnetic flux control device. In this manner, the output wave forms from the first and the second sensors 4, 5 can be controlled to have a matching amplitude.

Further, the induction units 7, 8 and the induction units 9, 10 may be disposed on different planes instead of a same plane.

Furthermore, the first and the second gaps G1, G2 may be disposed at different positions to have an improved degree of freedom in terms of the design of the rotation angle detector.

Furthermore, material used to form the induction units 7, 8, 9, 10 may be metal wire made of magnetic material being bendable. That is, for example, the induction units 7, 8, 9, 10 may be formed with a bundle of soft iron wires. In this manner, the induction units 7, 8, 9, 10 have an increased degree of freedom in terms of installability.

Furthermore, the magnetic sensors 4, 5 may be positioned farther from the magnet 1 than the positions described in the above-described embodiments. In this case, the induction units 7, 8, 9, 10 may be covered by magnetism sealing material to prevent external effect.

Furthermore, the magnet 1 may be fixedly disposed and the sensors 4, 5 may be rotated to detect the rotation angle.

Furthermore, the magnet 1 and the sensors 4, 5 may both be rotated.

Furthermore, magnetoresistive elements or other types of magnetic sensors may be used as the sensors 4, 5 instead of the Hall elements.

Furthermore, the rotation angle detector may be applied to detect the rotation angle of a crank shaft in an engine, of a tire, of an arm of an industrial robot, or the like beside detecting opening degree of the throttle valve.

Such changes and modifications are to be understood as being within the scope of the present invention as defined by the appended claims.

What is claimed is:

1. A rotation angle detector having a first part on a rotation axis for relative rotation to a second part comprising:

a magnet with a circular outer periphery in the first part, and magnetized for generating magnetic flux arrayed in a direction perpendicular to the rotation axis, wherein the rotation axis and a center of the magnet are substantially coaxial;

a first magnetic sensor for generating an output signal corresponding to a variation in the magnetic flux applied thereto;

a second magnetic sensor separately disposed from the first magnetic sensor for generating an output signal corresponding to a variation in the magnetic flux applied thereto;

a first magnetic flux induction means disposed in the second part for inducing magnetic flux from one circumferential portion of the magnet to an opposite circumferential portion of the magnet through a position of the first magnetic sensor, wherein the first magnetic flux induction means includes a first magnetic flux induction unit and a second magnetic flux induction unit, wherein each of the first magnetic flux induction unit and the second magnetic flux induction unit has a magnet facing portion at one end and a sensor facing portions at an opposite end, wherein the magnet facing portions of the first and the second magnetic flux induction units are disposed in radially opposite positions relative to the rotation axis of the magnet for receiving the magnetic flux, and wherein the sensor facing portions of the first and the second magnetic flux induction units are oppositely disposed to form a first magnetic gap; and a second magnetic flux induction means disposed in the second part for inducing magnetic flux from another circumferential portion of the magnet to another opposite circumferential portion of the magnet through a position of the second magnetic sensor at an angle of 90 degrees relative to the magnetic flux induced by the first magnetic flux induction means, wherein the second magnetic flux induction means includes a third magnetic flux induction unit and a fourth magnetic flux induction unit, wherein each of the third magnetic flux induction unit and the fourth magnetic flux induction unit has a magnet facing portion at one end and a sensor facing portion at the opposite end, wherein the respective magnet facing portions of the third and the fourth magnetic flux induction units are disposed in radially opposite positions relative to the rotation axis of the magnet for receiving the magnetic flux, and wherein the sensor facing portions of the third and the fourth magnetic flux induction units are oppositely disposed to form a second magnetic gap, wherein a first line defined by the positions of the magnet facing portions of the first and the second magnetic flux induction units and a second line defined by the positions of the magnet facing portions of the third and the fourth magnetic flux induction units intersect with each other substantially in an angle of 90 degrees about the rotation axis of the first part, the first magnetic sensor is disposed in the first magnetic gap, the second magnetic sensor is disposed in the second magnetic gap, the first magnetic gap between the sensor facing portions of the first and the second magnetic flux induction units and the second magnetic gap between the sensor facing portions of the third and the fourth magnetic flux induction units are positioned to share a same space in an intersecting manner and a relative rotation angle between the first part and the second part is detected based on the output signal from the first magnetic sensor and the output from the second magnetic sensor.

2. The rotation angle detector according to claim 1, wherein the magnet facing portions of the first and the second magnetic flux induction units are concavely curved in a concentric fashion relative to the center of the circular outer periphery of the magnet, and wherein the magnet facing portions of the third and the fourth magnetic flux induction units are concavely curved in a concentric fashion relative to the center of the circular outer periphery of the magnet.

3. The rotation angle detector according to claim 1, wherein the sensor facing portions of the first and the second magnetic flux induction units are arranged in such a fashion that the end faces are mutually parallel to form the first magnetic gap, and the sensor facing portions of the third and the fourth magnetic flux induction units are arranged in such a fashion that the end faces are mutually parallel to form the second magnetic gap.

4. The rotation angle detector according to claim 1, wherein the sensor facing portions of the first and the second magnetic flux induction units are protruded toward the first sensor to form the first magnetic gap, and the sensor facing portions of the third and the fourth magnetic flux induction units are protruded toward the second sensor to form the second magnetic gap.

5. A rotation angle detector having a first part on a rotation axis for relative rotation to a second part, said detector comprising:

a magnet with a circular outer periphery in the first part, and magnetized for generating magnetic flux arrayed in a direction perpendicular to the rotation axis, wherein the rotation axis and a center of the magnet are substantially coaxial;

a first magnetic sensor for generating an output signal corresponding to a variation in the magnetic flux applied thereto;

a second magnetic sensor separately disposed from the first magnetic sensor for generating an output signal corresponding to a variation in the magnetic flux applied thereto;

a first magnetic flux induction means disposed in the second part for inducing magnetic flux from one circumferential portion of the magnet to an opposite circumferential portion of the magnet through a position of the first magnetic sensor, wherein the first magnetic flux induction means includes a first magnetic flux induction unit and a second magnetic flux induction unit, wherein each of the first magnetic flux induction unit and the second magnetic flux induction unit has a magnet facing portion at one end and a second facing portion at an opposite end, wherein the magnet facing portions of the first and the second magnetic flux induction units are disposed in radially opposite positions relative to the rotation axis of the magnet for receiving the magnetic flux, and wherein the sensor facing portions of the first and the second magnetic flux induction units are oppositely disposed to form a first magnetic gap; and a second magnetic flux induction means disposed in the second part for inducing magnetic flux from another circumferential portion of the magnet to another opposite circumferential portion of the magnet through a position of the second magnetic sensor at an angle of 90 degrees relative to the magnetic flux induced by the first magnetic flux induction means, wherein the second magnetic flux induction means includes a third magnetic flux induction unit and a fourth magnetic flux induction unit, wherein each of the third magnetic flux induction unit and the fourth magnetic flux induction unit has a magnet facing portion at one end and a sensor facing portion at an opposite end, wherein the respective magnet facing portions of the third and the fourth magnetic flux induction units are disposed in radially opposite positions relative to the rotation axis of the magnet for receiving the magnetic flux, and wherein the sensor facing portions of the third and the fourth magnetic flux induction units are oppositely disposed to form a second magnetic gap, wherein a first line defined by the positions of the magnet facing portions of the first and the second magnetic flux induction units and a second line defined by the positions of the magnet facing portions of the third and the fourth magnetic flux induction units intersect with each other substantially in an angle of 90 degrees about the rotation axis of the first part, the first magnetic sensor is disposed in the first magnetic gap, the second magnetic sensor is disposed in the second magnetic gap, and a relative rotation angle between the first part and the second part is detected based on the output signal from the first magnetic sensor and the output from the second magnetic sensor, and wherein the first magnetic gap and the second magnetic gap are arranged to intersect mutually and substantially perpendicularly, and the first magnetic sensor and the second magnetic sensor are positioned adjacent to an intersection of the first magnetic gap and the second magnetic gap, and positioned within the first magnetic gap and the second magnetic gap respectively.

* * * * *